United States Patent [19]

Apps et al.

[11] Patent Number: 5,277,316

[45] Date of Patent: * Jan. 11, 1994

[54] LOW-DEPTH STACKABLE CAN TRAY

[75] Inventors: William P. Apps, Anaheim; Arne Lang-Ree, Manhattan Beach, both of Calif.

[73] Assignee: Rehrig-Pacific Company, Inc., Los Angeles, Calif.

[ * ] Notice: The portion of the term of this patent subsequent to Jun. 12, 2007 has been disclaimed.

[21] Appl. No.: 708,831

[22] Filed: May 29, 1991

Related U.S. Application Data

[60] Continuation of Ser. No. 504,399, Apr. 3, 1990, abandoned, which is a division of Ser. No. 272,039, Nov. 15, 1988, Pat. No. 4,942,532.

[51] Int. Cl.$^5$ .......................... B65D 21/02; B65D 1/24
[52] U.S. Cl. ..................................... 206/503; 206/529; 206/427; 220/608
[58] Field of Search ............... 206/821, 427, 499, 503, 206/518, 519; 220/608, 605, 604

[56] References Cited

U.S. PATENT DOCUMENTS

| D. 244,486 | 5/1977 | Johnson et al. ................ D87/1 R |
| D. 247,652 | 3/1978 | Carroll et al. ................... D87/1 R |
| D. 284,841 | 7/1986 | Rowland et al. ................ D9/456 |
| D. 291,178 | 8/1987 | Toms ................................ D9/345 |
| 2,907,509 | 10/1959 | Chamberlin ..................... 229/15 |
| 2,970,715 | 2/1961 | Kappel et al. ................... 220/21 |
| 2,979,222 | 4/1961 | Levine ............................. 220/21 |
| 3,009,579 | 11/1961 | Ettlinger, Jr. . |
| 3,092,284 | 6/1963 | Stout ............................... 220/21 |
| 3,106,308 | 10/1963 | Kazimier ......................... 220/21 |
| 3,148,797 | 9/1964 | Cloyd .............................. 220/21 |
| 3,155,268 | 11/1964 | Fogerty et al. .................. 220/21 |
| 3,250,564 | 5/1966 | Stern et al. ..................... 294/87.2 |
| 3,332,574 | 7/1967 | Earp ................................ 220/97 |
| 3,333,727 | 8/1967 | Belcher et al. . |
| 3,334,767 | 8/1967 | Cornelius et al. ............... 220/21 |
| 3,347,405 | 10/1967 | Motsenbocker et al. ........ 220/21 |
| 3,349,943 | 10/1967 | Box . |
| 3,369,659 | 2/1968 | Ettlinger, Jr. ................... 206/72 |
| 3,391,814 | 7/1968 | Box . |
| 3,391,815 | 7/1968 | Box . |
| 3,392,869 | 7/1968 | Needt .............................. 220/21 |
| 3,421,649 | 1/1969 | Waller ............................ 220/4 |
| 3,428,207 | 2/1969 | Schoeller ........................ 220/21 |
| 3,517,852 | 6/1970 | Schoeller ........................ 220/21 |

(List continued on next page.)

FOREIGN PATENT DOCUMENTS

| 1351218 | 12/1963 | France . |
| 1474782 | 3/1967 | France . |
| WO91/17097 | 11/1991 | PCT Int'l Appl. . |
| 568191 | 10/1975 | Switzerland . |
| 1115343 | 5/1968 | United Kingdom . |
| 1152038 | 5/1969 | United Kingdom . |
| 1182452 | 2/1970 | United Kingdom . |
| 2032886A | 11/1978 | United Kingdom . |
| 2220196A | 6/1989 | United Kingdom . |

OTHER PUBLICATIONS

Exhibit A: Photographs of prior art tray (photographs 1-4).

Primary Examiner—Joseph Man-Fu Moy
Attorney, Agent, or Firm—Banner, Birch, McKie & Beckett

[57] ABSTRACT

A reusable stackable tray for cans being formed by a rectangular wall structure, a web-like floor structure secured to and extending down from the wall structure and a plurality of spaced redoubt floor members spaced on and about and extending down from the bottom surface of the floor structure. Each of the redoubt floor members has a bevelled bottom edge perimeter such that a tray filled with cans can, without being lifted, be slidingly pulled and pivoted on the redoubt floor members directly on top of a layer of cans in another tray beneath it.

71 Claims, 7 Drawing Sheets

U.S. PATENT DOCUMENTS

| | | | |
|---|---|---|---|
| 3,568,879 | 3/1971 | Box | 220/97 |
| 3,651,976 | 3/1972 | Chadbourne . | |
| 3,756,429 | 9/1973 | Fleischer et al. | 214/10.5 R |
| 3,949,876 | 4/1976 | Bridges et al. . | |
| 3,982,654 | 9/1976 | Gottsegen | 220/21 |
| 4,040,517 | 8/1977 | Torokvei | 206/144 |
| 4,095,720 | 6/1978 | Delbrouck et al. | 220/21 |
| 4,155,451 | 5/1979 | Miller | 206/503 |
| 4,161,259 | 7/1979 | Palafox . | |
| 4,162,738 | 7/1979 | Wright | 220/21 |
| 4,195,746 | 4/1980 | Cottrell | 220/4 E |
| 4,204,617 | 5/1980 | Hirota | 224/45 A |
| 4,249,671 | 2/1981 | Crolli . | |
| 4,342,388 | 8/1982 | Torokvei | 206/203 |
| 4,342,403 | 8/1982 | Badtke et al. | 220/345 |
| 4,344,530 | 8/1982 | de Larosiere | 206/203 |
| 4,410,099 | 10/1983 | de Larosiere | 220/21 |
| 4,538,742 | 9/1985 | Prodel | 220/21 |
| 4,548,320 | 10/1985 | Box . | |
| 4,615,444 | 10/1986 | de Larosiere | 206/427 |
| 4,700,837 | 10/1987 | Hammett . | |
| 4,789,063 | 12/1988 | Hammett | 206/432 |
| 4,834,234 | 5/1989 | Langenbeck | 206/557 |
| 4,872,560 | 10/1989 | Langenbeck | 206/557 |
| 4,896,774 | 1/1990 | Hammett et al. | 206/516 |
| 4,928,841 | 5/1990 | Arthurs | 220/21 |
| 4,932,532 | 6/1990 | Apps et al. . | |
| 4,944,400 | 7/1990 | Van Onstein et al. | 206/509 |
| 5,009,053 | 4/1991 | Langenbeck et al. | 53/58 |
| 5,031,761 | 7/1991 | de Larosiere | 206/203 |
| 5,031,774 | 7/1991 | Morris et al. . | |

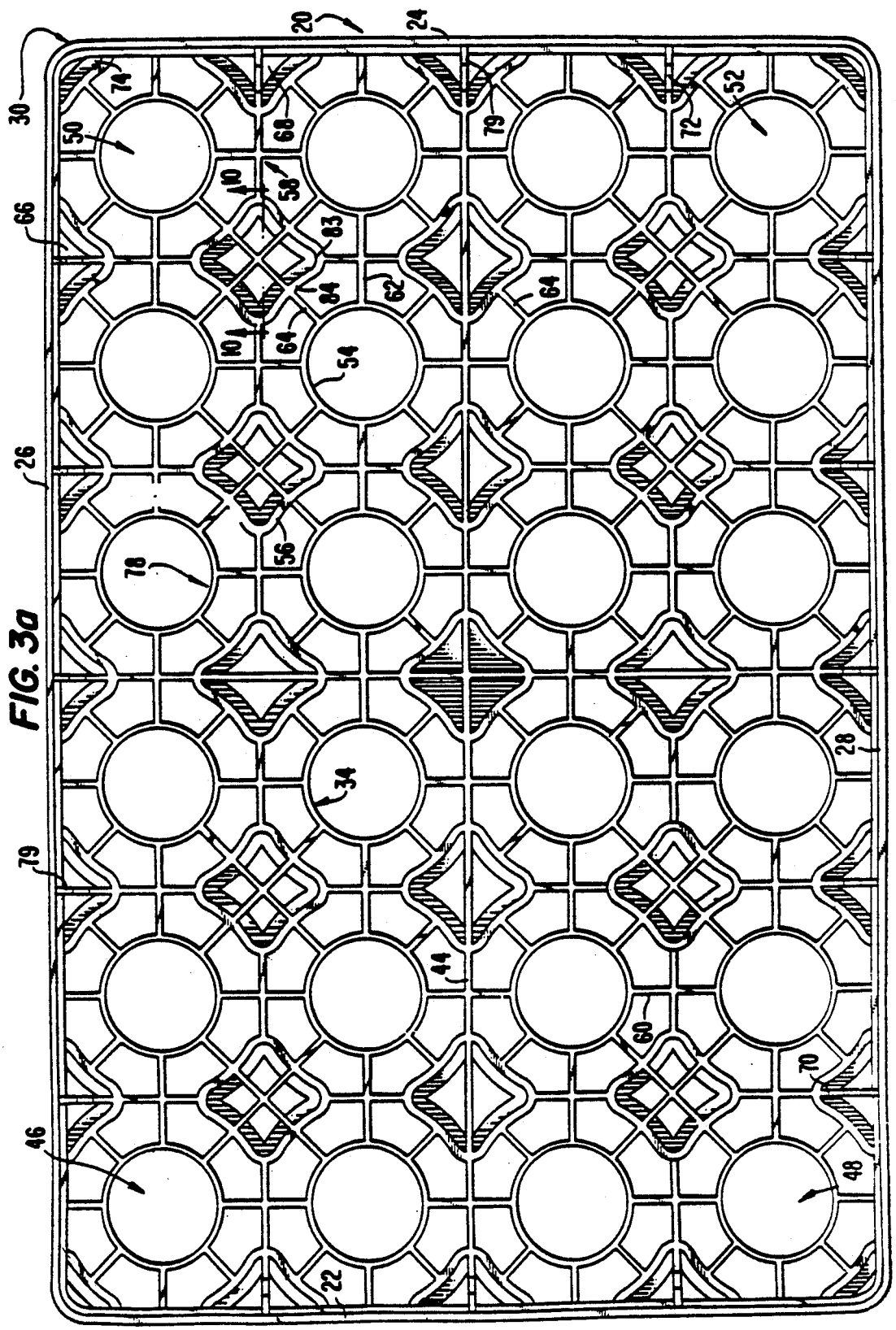

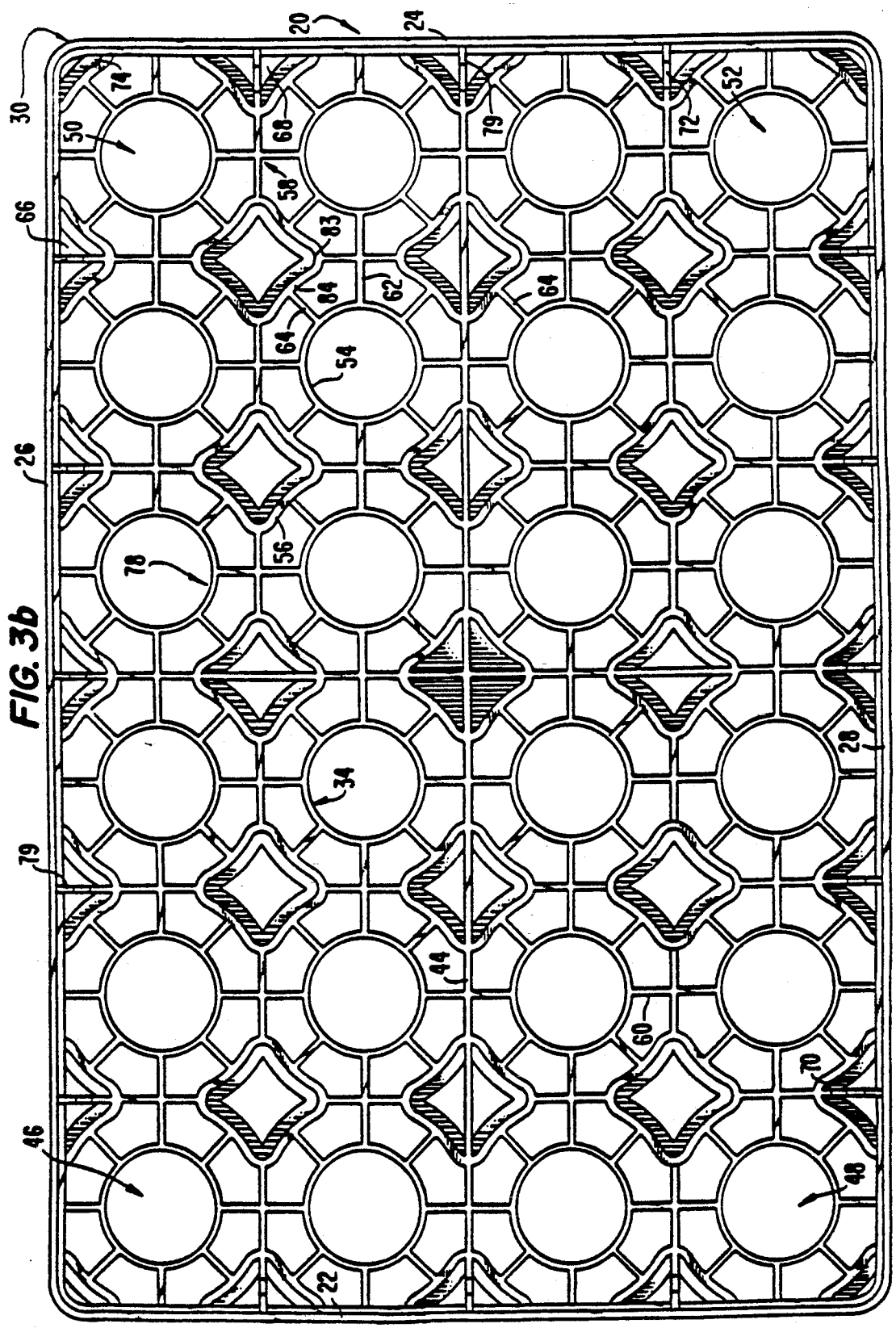

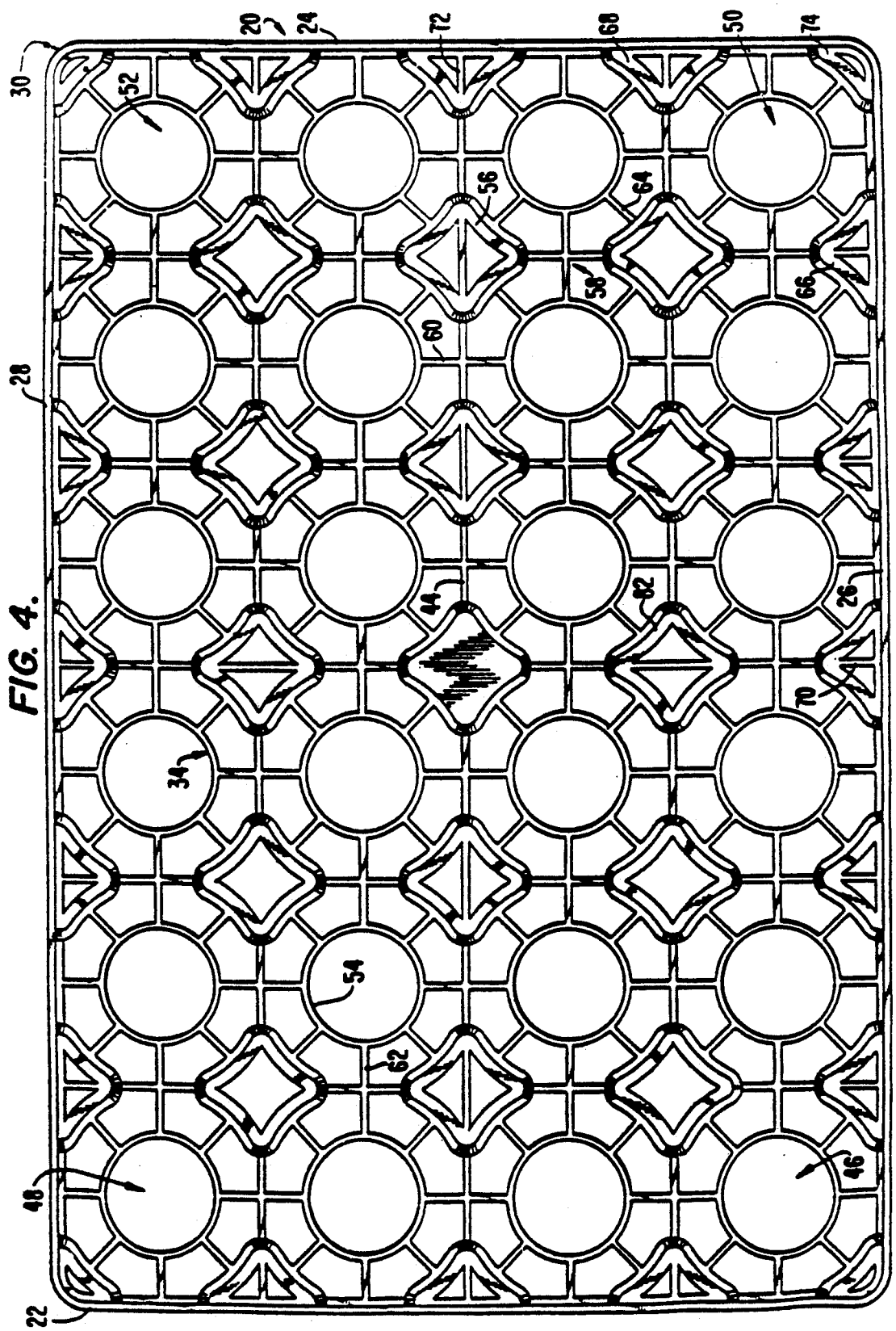

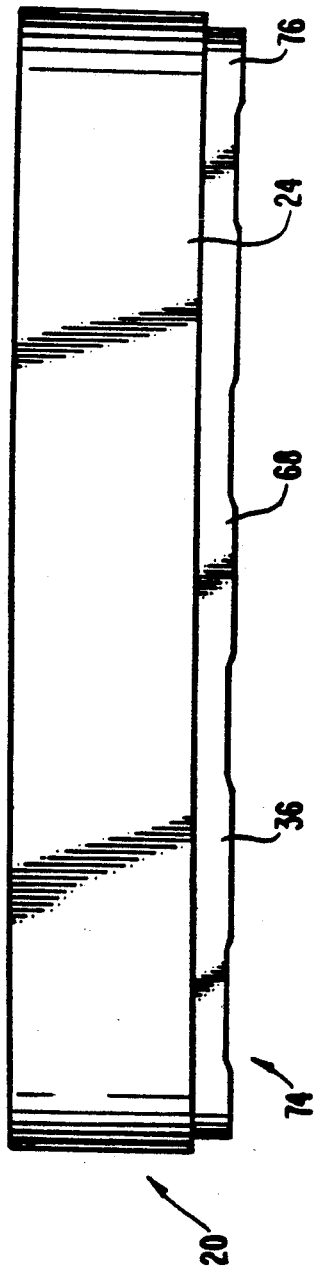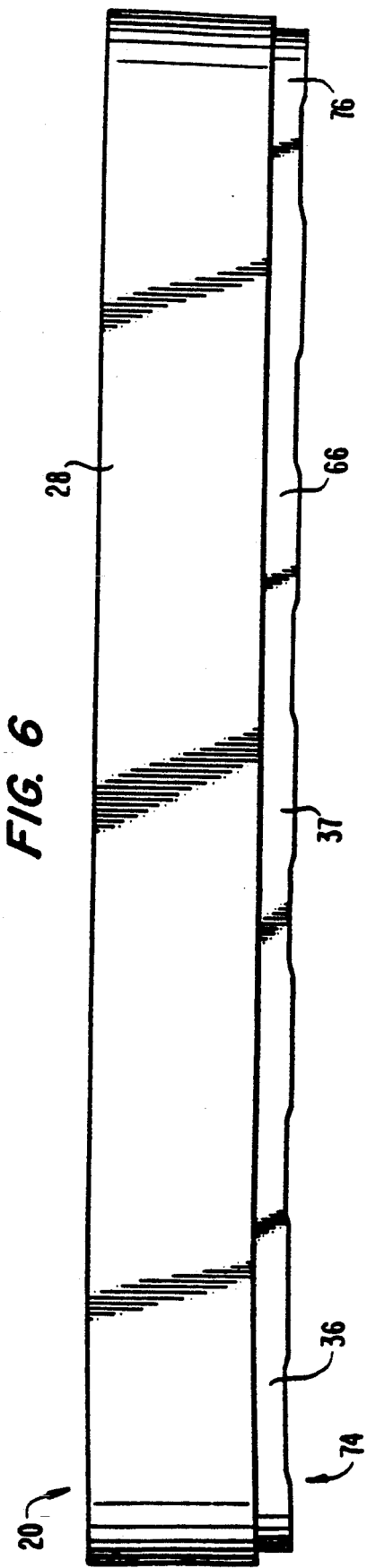

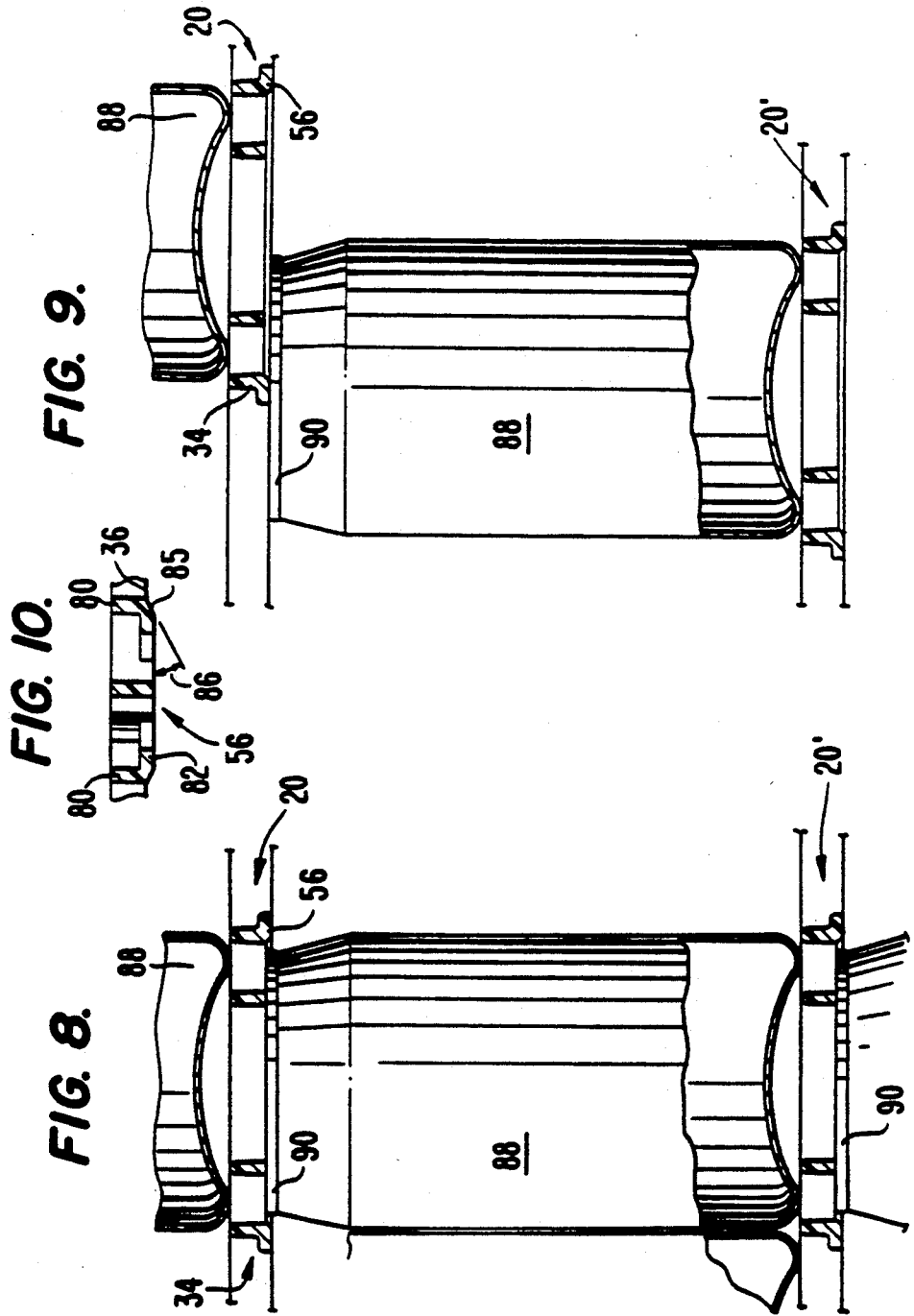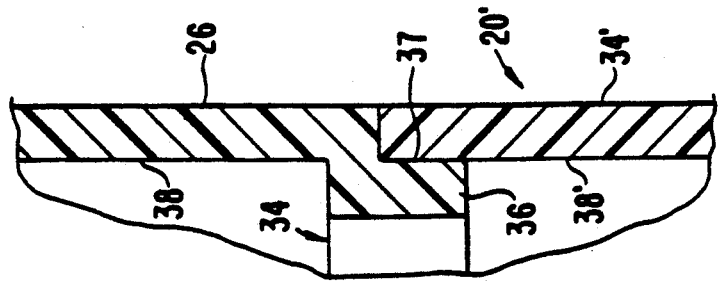

LOW-DEPTH STACKABLE CAN TRAY

This application is a continuation of application Ser. No. 07/504,399, filed Apr. 8, 1990, which is a division of Ser. No. 07/272,039 filed Nov. 15, 1988, which was issued on Jun. 12, 1990 as U.S. Pat. No. 4,932,532.

BACKGROUND OF THE INVENTION

The present invention relates to trays for transporting and storing containers such as beverage containers, and more particularly for those storing two or more six-packs of pull-top aluminum cans. It further relates to such trays which can be securely stacked one on top of another both when full and when empty.

Pull-top aluminum cans for soft drinks, other beverages and the like are stored and transported during the distribution stage typically in short-walled cardboard trays or in cardboard boxes. On the other hand as to bottles, because of the ever increasing cost in disposable tertiary packaging, returnable, reusable containers are becoming popular for the storage and handling of bottles. However, unlike plastic or glass bottles which have rounded edges on their crown or top, pull-top aluminum cans have square sharp corners (as compared with bottle tops) where the top of the can attaches to the sides thereof. Therefore, particular difficulties have been encountered in the stacking and manipulating of the trays of cans stacked relative to one another. In fact, there are no known returnable, reusable trays suitable for supporting pull-top aluminum cans and which can, when filled with such cans, be stacked securely one on top of another, so that the top tray of a stack of filled trays can be easily pulled off and along the stack without being lifted. In other words, the trays should be constructed so that when loaded they can be easily pivoted and slid off of loaded trays beneath them without having to be lifted.

SUMMARY OF THE INVENTION

Accordingly, it is a principal object of the present invention to provide a returnable and reusable tray for storing and transporting cans.

It is a further object of the present invention to provide a returnable plastic tray adapted to accommodate and support therein twenty-four twelve ounce pull-top aluminum cans.

It is a still further object of the present invention to provide a returnable tray, particularly adapted for cans having square sharp top corners, which when full can be pulled and pivoted, without being lifted, on and along a top surface of another layer of such cans.

Another object of the present invention is to provide a novel, sturdy, reusable tray for storing and handling containers, and such tray having a webbed floor design which is interesting and aesthetically pleasing.

A further object of the present invention is to provide a sturdy reusable tray for supporting, storing and transporting beverage containers which tray is lightweight and thus can be easily manipulated and carried, and which can also be economically constructed.

Directed to achieving these objects, a unique stackable, reusable tray especially designed for stacking and storing cans having sharp top edges is provided herein. This stackable tray is formed by pairs of side walls and end walls integrally joined at their edges to define a rectangular structure. A floor structure is secured to and positioned generally within the rectangular structure. The floor structure is adapted for supporting thereon a plurality of cans positioned within the rectangular structure, and in a preferred embodiment is adapted to accommodate four six-packs (six containers in an interconnected two-by-three array) thereon. The floor structure is configured to define a web having a plurality of spaced, generally circularly-shaped members positioned in longitudinal and lateral rows. Redoubt members are spaced and positioned in the middle of these circularly-shaped members and are connected thereto and therebetween by a plurality of struts. The spaced redoubt members have the bottom surfaces thereof extending below the rest of the floor structure a slight distance. The redoubt members further have their bottom perimeters defining edges bevelled at an angle of approximately twenty-five degrees plus or minus five degrees relative to the rest of the floor structure. The bottom surfaces of the redoubt members thereby are configured so that a full tray can be easily slid and pivoted on the top of a layer of aluminum cans directly beneath it.

Other objects and advantages of the present invention will become more apparent to those persons having ordinary skill in the art to which the present invention pertains from the following description taken in conjunction with the accompanying drawings.

BRIEF DESCRIPTION OF THE DRAWINGS

FIG. 3a is a top plan view of the tray of FIG. 1.

FIG. 3b is a view similar to that of FIG. 3a illustrating a variation on the design of the tray of FIG. 1.

FIG. 4 is is a bottom plan view of the tray of FIG. 1.

FIG. 5 is an end elevational view of the tray of FIG. 1.

FIG. 6 is a side elevational view of the tray of FIG. 1.

FIG. 7 is a fragmentary cross-sectional view of a side (or end) of a pair of empty trays of FIG. 1 showing their interlocking nesting arrangement.

FIG. 8 is a cross-sectional view of a portion of the tray of FIG. 1 when loaded, locked and supported on a similar said loaded tray.

FIG. 9 is a view similar to that of FIG. 8 showing the trays thereof in a lock broken and sliding relation.

FIG. 10 is an enlarged cross-sectional view taken along line 10—10 in FIG. 3a.

DETAILED DESCRIPTION OF PREFERRED EMBODIMENTS OF THE INVENTION

Figure 1:
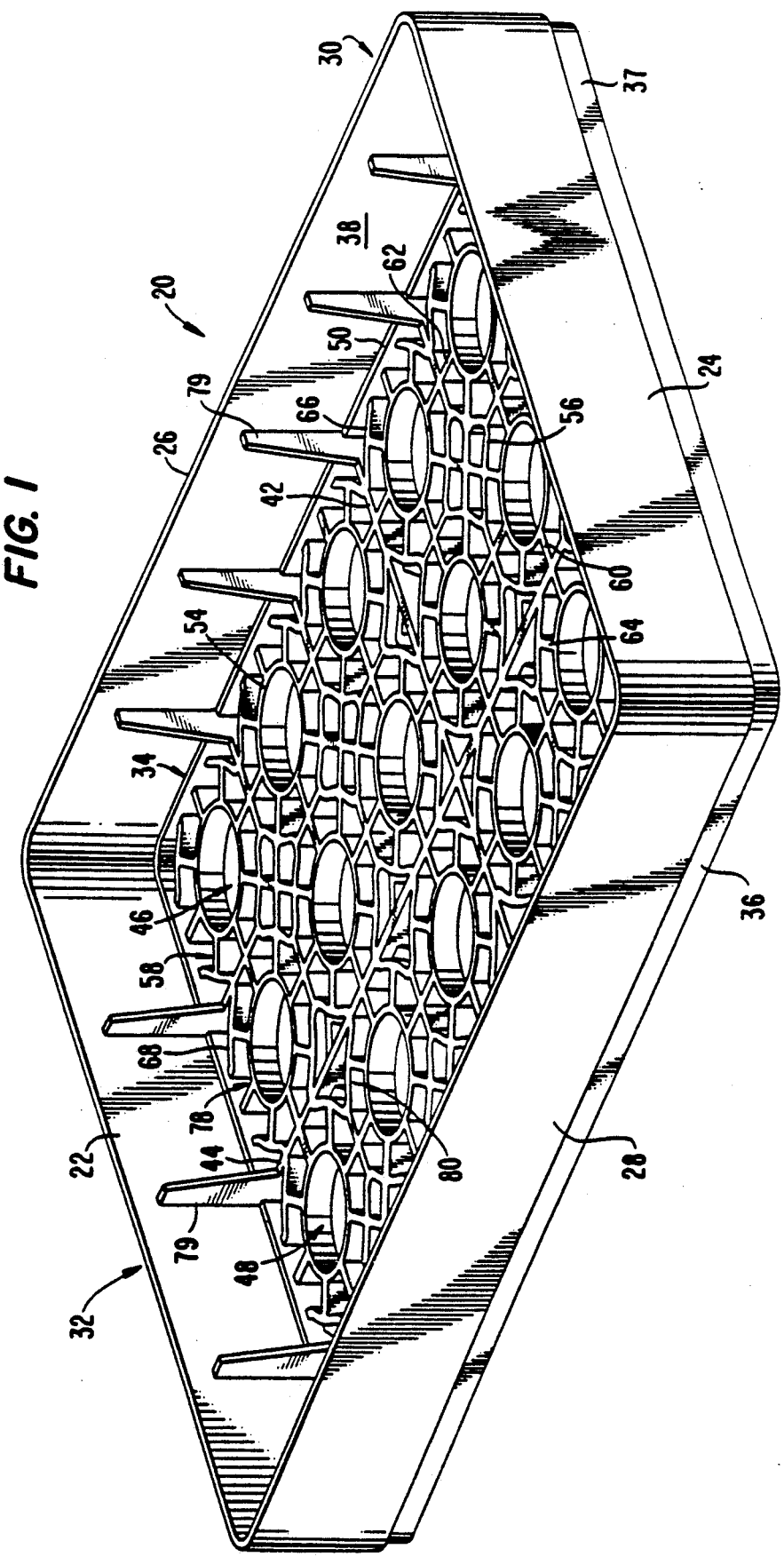
FIG. 1 is a top perspective view of a reusable stackable tray for cans of the present invention.
Figure 2:
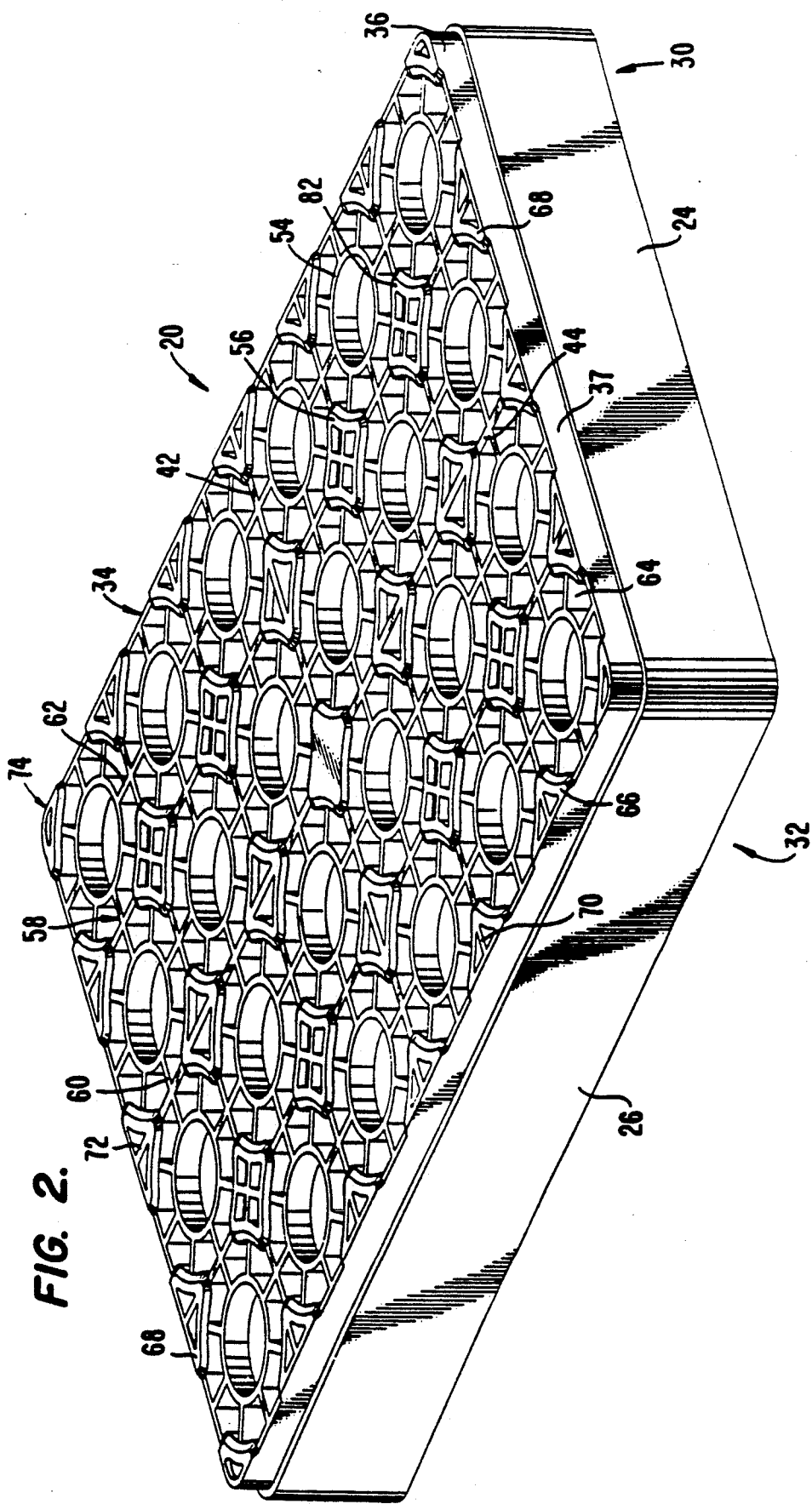
FIG. 2 is is a perspective view of the tray of FIG. 1 when upside down.

Referring to the drawings a reusable, stackable tray for cans is illustrated generally at 20, and is formed by a unitary integral plastic construction. It comprises a pair of end walls 22, 24, and a pair of opposed side walls 26, 28 wherein the end and side walls are integrally joined to form four rounded corners as shown for example at 30. As seen, the end and side walls 22, 24, 26, 28 form a rectangular structure shown generally at 32. A floor structure designated generally by reference numeral 34 is positioned within and secured to the base of the rectangular structure 32. The perimeter structure 36 of the floor structure 34 has its outer surfaces 37 spaced inward about the entire perimeter thereof inside of the inside surface 38 of the rectangular structure 34 to thereby provide a stepped-in design. This allows one tray 20 to be stacked and nested securely, but removably, within another similar or identical empty tray 20' and thereby resist relative lateral movement as to the surface 38' of the rectangular structure 34'. This nesting relation is best illustrated in FIG. 7.

The floor structure 34, as seen in the drawings, defines a web-like construction which minimizes the use of the plastic material thereby making the tray 20 lighter and easier to handle and also reducing the amount of the plastic construction material required. It further presents a pleasing and interesting design. The central dividing struts 42, 44 thereof extending, respectively, between the centers of the opposed side walls 26, 28 and the centers of the opposed end walls 22, 24 divide the floor structure 34 into four equal cells shown generally at 46, 48, 50 and 52, and aid in manufacturing by providing flow channels for the plastic material from the point of injection at the part center to the walls. Each cell then represents the storage space for an interconnected six-pack of beverage cans, and includes six spaced circular members such as shown by 54 in two-by-three arrays. Spaced redoubt members such as shown by 56 are positioned in the middle of four adjacent circular members 54. A plurality of struts such as shown generally at 58 then interconnects the circular members 54, the redoubt members 56, and the floor perimeter structure 36.

The struts 58 comprise lateral struts such as shown by 60 which directly connect laterally adjacent circular members 54, longitudinal struts such as shown at 62 which directly connect longitudinally adjacent circular members 54, and radial struts such as shown at 64 which directly connect the sides of the redoubt members 56 to the circular members 54. For the redoubt members 56 positioned within the cells 46, 48, 50 or 52, radial struts 64 extend therethrough, as shown in FIG. 3a, for example. In another and perhaps more preferred design, the radial struts 64 do not extend through the redoubt members, as illustrated in FIG. 3b. Similarly, the dividing struts 42, 44 extend through the redoubt members 56 positioned between adjacent cells 46, 48, 50 or 52.

Partial side and end engaging redoubt members such as shown at 66, 68, respectively, are positioned spaced along the floor perimeter structure 34, and are shown in elevation in FIGS. 5 and 6. These partial side and end engaging redoubt members 66, 68 have lateral or longitudinal redoubt struts 70, 72, respectively, extending through them as shown. Additionally, the corners such is shown at 74 of the floor perimeter structure 34 are rounded and have corner engaging redoubt members thereat such as shown at 76.

The tops of each of the struts 58, redoubt members 56, and circular members 54 all have their upper surfaces defining a smooth upper plane illustrated generally at 78 on which beverage cans can be positioned, supported and easily slid along without obstruction for inserting the cans into the tray 20 and removing them from it. A plurality of spaced reinforcing posts such as shown at 79, interconnect the floor structure 34 with the rectangular structure 32 by engaging the tops of adjacent lateral or longitudinal struts 60, 62 and extending up and secured to the inside surface 38 of the rectangular structure 32.

The redoubt members 56 are each formed by a continuous upright wall 80 and a redoubt floor 82 secured at the bottom end thereof, as best shown in FIG. 10. The redoubt walls 80 are configured in a square-like shape having rounded corners 83 and with the middles 84 of each of the sides thereof (where the radial struts 64 engage) being curved inwardly a slight amount. The bottom surfaces of the redoubt walls 81 lie generally in the plane of the bottom surfaces of the struts 58, the floor perimeter structure 36 and the circular members 54. The redoubt floor 82, however, extends below that plane. The redoubt floor 82 has about its entire bottom perimeter a bevelled edge 85 which is formed at an angle 86 of, for example, twenty-five degrees plus or minus five degrees relative to the bottom plane of the rest of the floor structure 36. This angle is appropriate for the current material and market can design. However, this angle would be adjusted as needed to accommodate different materials and can designs.

These small, permanent, spaced redoubt members 56 assist the trays 20 when full to stack securely upon layers of cans 88 beneath them, as shown in FIG. 8. The cans 88 are those such as described earlier herein and have square sharp top corners 90. They also allow the tray 20 to be twisted or pivoted slightly while stacked on a similar layer of cans 88 therebeneath and then slid easily off of the loaded tray beneath it. This motion is best illustrated in FIG. 9. This allows a delivery driver, for example, to pull off the top tray 20 of any tall stack without having to lift that top tray. In other words, a loaded tray 20 can be easily slid off the loaded tray directly beneath it. These redoubt members 55 are also spaced evenly relative to one another to conform to a twenty-four can configuration. It is also within the scope of this invention for tray 20 to be configured and proportioned differently as needed to accommodate different numbers, sizes and arrangements of containers.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

What is claimed is:
1. A can tray comprising:
a low-depth wall structure;
a floor structure connected to said wall structure, said floor structure having a floor top surface and a floor bottom surface, said floor top surface having a plurality of support areas, each for supporting a separate can thereon such that a layer of cans can be supported on said floor top surface; and
a plurality of spaced members depending downwardly from said floor bottom surface, said members being spaced relative to each other such that, when said floor bottom surface is supported on top of a layer of rimmed cans therebeneath and thereby in a stacked position, said members block the free sliding of said floor bottom surface on the rims of the cans therebeneath, said spaced members including a bottom surface portion and slanted edges extending upwardly therefrom, such that, when said floor structure is twisted from the stacked position about a generally vertical axis, said slanted edges ride up onto the rims to a sliding unblocked position wherein said bottom surface portions of said spaced members are on top of and contacting the rims and said floor structure can thereby slide generally freely on the rimmed cans therebeneath wherein said floor structure includes a circular member for each said support area such that an array of circular members is defined on said floor top surface; and wherein said spaced members are disposed generally between adjacent said circular members.

2. The can tray of claim 1 wherein said members are integrally molded with said floor structure.

3. The can tray of claim 1 wherein said wall and floor structures are integrally molded.

4. The can tray of claim 3 wherein said diamond shaped configurations each have inwardly curving sides.

5. The can tray of claim 1 wherein each said circular member defines within the perimeter thereof an open space between said floor top and bottom surfaces.

6. The can tray of claim 1 wherein said floor structure includes struts interconnecting said spaced members and at least some of the adjacent said circular members.

7. The can tray of claim 1 wherein said wall structure is formed on top of said floor structure.

8. The can tray of claim 1 wherein said floor structure has a generally rectangular floor periphery and some of said spaced members engage said floor periphery.

9. The can tray of claim 1 wherein said wall structure includes an inward wall surface and a plurality of spaced columns on said inward wall surface.

10. The can tray of claim 9 wherein said columns extend only part way up the height of said wall structure.

11. The can tray of claim 10 wherein said columns extend down to and engage said floor bottom surface.

12. The can tray of claim 9 wherein said columns are each disposed between adjacent said support areas.

13. The can tray of claim 9 wherein said wall structure is rectangularly configured and has rounded corners, a pair of end walls, each including at least one said column, and a pair of side walls, each including at least two of said columns.

14. The can tray of claim 1 wherein said floor structure includes a central longitudinal strut extending the full length of said floor structure and a central lateral strut extending the full width of said floor structure.

15. The can tray of claim 14 wherein some of said spaced members are positioned on said longitudinal strut and some of said spaced members are positioned on said lateral strut.

16. The can tray of claim 14 wherein said circular members form a four-by-six array.

17. The can tray of claim 1 wherein said slanted edges comprise bevelled edges extending down at angles of between twenty and thirty degrees.

18. The can tray of claim 1 wherein said floor structure has a web-like configuration.

19. The can tray of claim 1 wherein at least some of said members each have a generally diamond shaped configuration whose axes are oriented in the length and width dimensions of said floor bottom surface.

20. The can tray of claim 1 wherein said spaced members have a generally quadrilateral shape defined by the intersection of four sides to thereby form four corners.

21. The can tray of claim 1 wherein said spaced members disposed adjacent to an edge of said floor structure are generally triangular in shape.

22. The can tray of claim 21 wherein said spaced members disposed adjacent to said edge of said floor structure are oriented with a side of said triangular shape aligned parallel with said edge of floor structure.

23. The can tray of claim 1 wherein said spaced members are also disposed in the corners of said floor bottom surface.

24. The can tray of claim 1 wherein said floor top surface defines a generally smooth planar surface between adjacent said separate cans supported thereon.

25. The can tray of claim 1 wherein said separate cans are directly adjacent to one another having only air space therebetween.

26. The can tray of claim 14 wherein said central longitudinal and central lateral struts define portions of said can support areas of said floor top surface and wherein said floor top surface is unobstructed by said central longitudinal and lateral struts across the entire expanse thereof, such that a can supported on said floor top surface can be moved freely across the entire floor top surface.

27. The can tray of claim 1 wherein said bottom surface portions of said spaced members are spaced relative to one another.

28. The can tray of claim 1 wherein said bottom surface portions of said spaced members are generally horizontally disposed.

29. The can tray of claim 1 wherein said bottom surface portions of said spaced members are disposed generally parallel to said floor top surface.

30. The can tray of claim 1 wherein each said bottom surface portion forms a rounded connection with said slanted edges extending upwardly therefrom.

31. The can tray of claim 1 wherein said slanted edges extend up to and engage said floor bottom surface.

32. The can tray of claim 1 wherein said bottom surface portions of said spaced members define the lowermost surface of said can tray.

33. The can tray of claim 1 wherein said floor structure has an outer perimeter whose dimensions are less than those of an outer perimeter the top of said wall structure such that said floor structure can nest down and within the top of a corresponding said wall structure of another said can tray therebeneath.

34. The can tray of claim 1 wherein said spaced members are positioned such that the rims of the cans are not positively engaged when said floor bottom surface is supported on top of a layer of rimmed cans therebeneath.

35. A can tray comprising:

floor structure having a floor bottom;

wall structure connected to and extending up from said floor structure; and protuberance means for positioning the tray when loaded on a layer of rimmed cans therebeneath in a blocked position wherein free sliding on the layer is blocked and for repositioning the blocked and loaded tray by twisting the loaded tray a slight amount about a generally vertical axis to an unblocked position wherein the loaded tray, with no significant lifting thereof, can be slid on the layer of rimmed cans therebeneath;

wherein said protuberance means includes a plurality of spaced, island protuberance members secured to and depending down from said floor bottom and on which the loaded tray when in the unblocked position can slide on the rims of the cans therebeneath.

36. The can tray of claim 35 wherein said protuberance members are positioned between adjacent rimmed cans in the layer therebeneath when the loaded tray is in the locked position.

37. The can tray of claim 36 wherein said floor structure includes a plurality of struts connected to said protuberance members.

38. The can tray of claim 37 wherein said floor structure include a plurality of spaced circular members spaced from said protuberance members and connected thereto by said struts.

39. The can tray of claim 35 wherein each said protuberance member has a bevelled edge perimeter.

40. The can tray of claim 39 wherein said bevelled edge perimeter extends down at an angle of twenty-five plus or minus five degrees.

41. The can tray of claim 35 wherein said floor is formed by molding polyethylene.

42. The can tray of claim 35 wherein at least some of said island protuberance members have a generally quadrilateral shape which thereby forms four corners of said island protuberance members.

43. The can tray of claim 35 wherein at least some of said island protuberance members disposed adjacent to an edge of said can tray are generally triangular in shape.

44. The can tray of claim 43 wherein said spaced, island protuberance members disposed adjacent to said edge of said floor structure are oriented with a side of said triangular shape aligned parallel with said edge of said floor structure.

45. The can tray of claim 35 wherein said island protuberance members are disposed in the corners of said floor bottom surface.

46. The can tray of claim 35 wherein said floor structure further comprises a floor top supporting a layer of cans and defining a generally smooth planar surface between adjacent cans supported thereon.

47. The can tray of claim 35 wherein said rimmed cans are directly adjacent to one another such that only air space is therebetween.

48. The can tray of claim 37 wherein said floor structure includes a central longitudinal strut and a central lateral strut and wherein a top surface of said floor structure is unobstructed by said central longitudinal and lateral struts across the entire expanse thereof, such that a can supported on said floor top surface can be moved freely across both the length and width of the entire floor top surface.

49. The can tray of claim 35 wherein said floor structure has an outer perimeter whose dimensions are less than those of an outer perimeter of the top of said wall structure such that said floor structure can nest down and within the top of a corresponding said wall structure of another said can tray therebeneath.

50. The can tray of claim 39 wherein each said spaced, island protuberance member further includes a bottom surface portion disposed generally within said bevelled edge perimeter.

51. The can tray of claim 50 wherein said bottom surface portions of said protuberance members are spaced relative to one another.

52. The can tray of claim 50 wherein said bottom surface portions of said spaced, island protuberance members contact the rims of the cans therebeneath when the unlocked tray slides thereon.

53. The can tray of claim 35 wherein said spaced members are positioned such that the rims of the cans are not positively engaged when said floor bottom surface is supported on top of a layer of rimmed cans therebeneath.

54. A stackable tray comprising:

a pair of opposed side walls having bottom surfaces lying generally in a plane;

a pair of opposed end walls having end portions and bottom surfaces lying generally in a plane, said end walls being integrally joined at said end portions with said side walls to define a rectangular structure;

a floor structure secured to and positioned generally within said rectangular structure, said floor structure defining a support surface for a plurality of cans positioned generally within said rectangular structure, said floor structure comprising a plurality of spaced, generally circularly-shaped members, a plurality of redoubt members, and strut means;

said plurality of spaced, generally circularly-shaped members being positioned in longitudinal and lateral rows and defining the four corners of a plurality of parallelograms;

each of said redoubt members being spaced and positioned generally in the middle of a different one of said parallelograms;

said circularly-shaped members having bottom surfaces thereof lying generally in a plane;

said redoubt members having bottom surfaces thereof lying generally in a plane;

said strut means interconnecting said circularly-shaped members and said redoubt members;

said strut means having bottom surfaces thereof lying generally in a plane; and said plane of said bottom surfaces of said redoubt members being spaced a distance below the lower of said planes of said circularly-shaped members and of said strut means such that said floor structure when resting on a layer of cans therebeneath is positionable in a blocked position such that substantial free lateral movement thereof relative to the layer of cans is prevented.

55. The stackable tray of claim 54 wherein said strut means includes, for each of said parallelograms, first struts extending longitudinally and interconnecting said circularly-shaped members which are longitudinally adjacent and extending laterally and interconnecting said circularly-shaped members which are laterally adjacent.

56. The stackable tray of claim 55 wherein said strut means further includes, for each of said parallelograms, second struts extending radially and interconnecting each of said corner circularly-shaped members and said redoubt member within said parallelogram.

57. The stackable tray of claim 56 wherein said strut means further includes, for each of said parallelograms, third struts extending longitudinally and laterally and interconnecting said redoubt members which are longitudinally and laterally adjacent, respectively.

58. The stackable tray of claim 54 wherein said strut means includes, for each of said parallelograms, diagonally-disposed radial struts directly connecting each of said corner circularly-shaped members to said redoubt member within said parallelogram.

59. The stackable tray of claim 54 wherein said strut means includes longitudinal and lateral redoubt struts directly connecting longitudinally and laterally adjacent redoubt members, respectively.

60. The stackable tray of claim 54 wherein said floor structure has a bottom structure four-sided perimeter, and at least some of said redoubt members comprise side redoubt members disposed on at least two sides of said four-sided perimeter.

61. The can tray of claim 60 wherein said side redoubt are generally triangular in shape.

62. The can tray of claim 61 wherein said side redoubt members are oriented with a side of said triangular shape aligned parallel with an edge of floor structure.

63. The stackable tray of claim 54 wherein said floor structure has a bottom structure four-sided perimeter, and at least some of said redoubt members comprise side redoubt members disposed on each side of said four-sided perimeter.

64. The stackable tray of claim 54 wherein said parallelogram is a square.

65. The stackable tray of claim 54 wherein said plurality of circularly-shaped members comprise twenty-four circularly-shaped members arranged to define four three-by-two arrays so that each can of four six-packs of cans is associated with and is generally disposed on one of said circularly-shaped members.

66. The stackable tray of claim 54 further comprising said end and side walls having wall inner surfaces, and a plurality of spaced posts secured directly to said wall inner surface and to said floor structure.

67. The stackable tray of claim 54 wherein said floor structure is integrally formed with said rectangular structure.

68. The stackable tray of claim 54 wherein said support surface defines a generally smooth planar surface between adjacent cans supported thereon.

69. The stackable tray of claim 54 wherein said cans are directly adjacent to one another such that only air space is therebetween.

70. The can tray of claim 54 wherein said floor structure has an outer perimeter whose dimensions are less than those of an outer perimeter of the top of said rectangular structure such that said floor structure can nest down and within the top of a corresponding said rectangular structure of another said stackable tray therebeneath.

71. The stackable tray of claim 54 wherein said spaced members are positioned such that the rims of the cans are not positively engaged when said floor bottom surface is supported on top of a layer of rimmed cans therebeneath.

* * * * *